United States Patent [19]
Williams

[11] Patent Number: 5,975,129
[45] Date of Patent: Nov. 2, 1999

[54] HYDRAULICALLY OPERATED PRESSURE RELIEF VALVE

[76] Inventor: Richard D. Williams, 3023 Lonesome Ridge, Sugar land, Tex. 77478

[21] Appl. No.: 09/087,524

[22] Filed: May 29, 1998

[51] Int. Cl.[6] ................................................. F16K 21/10
[52] U.S. Cl. .................................. 137/514.7; 137/514.5; 188/297
[58] Field of Search ............................. 137/514.7, 514.5, 137/514; 188/297

[56] References Cited

U.S. PATENT DOCUMENTS

| | | | |
|---|---|---|---|
| 793,788 | 7/1905 | Hochfeldt | 137/514.7 |
| 2,142,410 | 1/1939 | Quick | 137/514.7 |
| 2,243,711 | 5/1941 | Lamb | 137/514.7 |
| 2,361,881 | 10/1944 | Sheppard | 137/514.7 |
| 2,516,247 | 7/1950 | Nuenemann | 137/514.7 |
| 3,550,617 | 12/1970 | Johnson | 137/514.5 |
| 3,709,563 | 1/1973 | Shellhause | 137/514.5 |
| 4,221,204 | 9/1980 | Meyer | 137/514.7 |
| 4,321,945 | 3/1982 | Chabat-Courrede | 137/514.7 |
| 4,481,974 | 11/1984 | Schmitt et al. | 137/514 |
| 4,531,542 | 7/1985 | Looney | 137/514.7 |
| 4,617,959 | 10/1986 | Yamada | 137/514.7 |
| 4,889,623 | 12/1989 | Prior et al. | 137/514 |
| 5,685,333 | 11/1997 | Skaryd | 137/514 |

*Primary Examiner*—Denise L. Ferensic
*Assistant Examiner*—Joanne Y. Kim
*Attorney, Agent, or Firm*—Gunn & Associates, P.C.

[57] ABSTRACT

This disclosure is directed to a relief valve connected to the output manifold of a triplex mud pump. The valve body includes an inlet mud flow opening, an internal passage with a movable valve element to modulate flow, and a mud outlet opening for connection with the mud line and drill stem. The movable valve element connects to a piston rod. The rod is connected to a dual chamber, hydraulically operated force creating, air cushioned regulator which adjusts the force on the piston rod and thereby adjusts the position of the valve element.

11 Claims, 1 Drawing Sheet

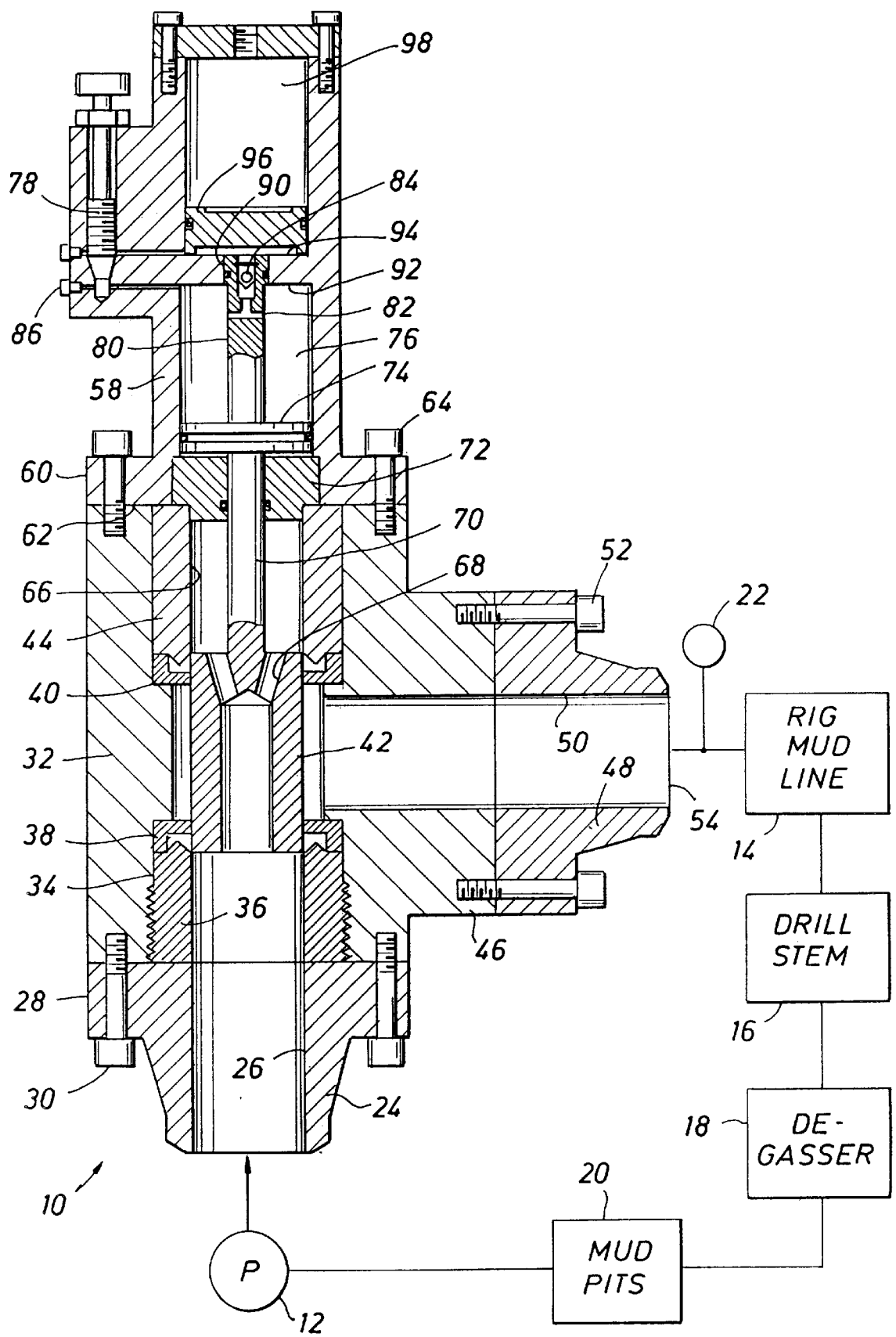

HYDRAULICALLY OPERATED PRESSURE RELIEF VALVE

BACKGROUND OF THE DISCLOSURE

The present disclosure is directed to a pressure relief valve installed with a mud pump. The function and operation of this valve will become more apparent on a review of the context in which the device is used. To set the stage, consider the operation of a typical triplex mud pump which is delivering a large volume of mud flow for a drilling rig. The mud is delivered to the drill stem to flow down the string of drill pipe and out through the drill bit appended to the lower end of the drill stem. It flows through the drill bit. The flow of mud cools the drill bit and reduces the temperature so that it lasts longer. Moreover, the mud flow is jetted out through a set of openings in the drill bit so that the mud hydraulically washes away the face of the well borehole if it is formed of soft materials. In addition, it washes away rock chips and cuttings which are generated as the drill bit advances. Then, the mud flow must return to the surface in the annular space on the outside of the drill stem and on the interior of the open hole formed by the drilling process. While portions of the borehole may be cased from the surface, the mud flow must be of sufficient velocity that the mud is returned to the surface so that chips and cuttings which are inherently heavier than the mud are flushed to the surface and delivered. This requires a substantial flow velocity. The cooling necessary also requires a substantial velocity. The mud flow velocities required mandate a high volume of mud. It is not uncommon that a triplex mud pump will deliver 500 or even 1,000 gallons per minute through the drill stem. This substantial flow must be delivered under control. As will be understood, the flow path down through the drill stem and back through the annular space describes a U-tube. The U-tube will therefore prompt a return at the surface but not with adequate pressure. Pressure levels at the pump side have to be raised to get the velocity and volumetric throughput desired. It is not uncommon for the triplex pump to be required to deliver mud flow at 1,000 psi and even higher. The wellhead pressures at the pump must be much higher if there is substantial flow pressure resistance along the flow path. The pump therefore is often operated at a very high pressure.

The drill stem in a deep well is an impediment to flow, thereby resulting in higher back pressures. The impediment to flow is overcome by applying greater pressures at the surface. In this regard, the mud pump typically could be operated at pressures as high as 5,000 psi output. Because of the great variety of circumstances in which the drilling rig may be used, the output pressure of the mud pump may vary widely. In one regard, the mud pump output pressure will vary with the change in pump speed. Sometimes, the prime mover for the mud pump will not run smoothly. The mud pump itself has a characteristic pressure peak signature. Normally, mud pumps are constructed with three large cylinders which provide three pressure peaks during each cycle of operation. These pressure peaks can be excursions as great as 200 or 300 psi on top of the prevailing baseline pressure.

Because of variations in motor speed, because of the three cylinder construction involved, the mud pump output pressure will vary significantly. The present disclosure is directed to a regulator which is a pressure relief valve able two control and stabilize the pressure downstream of the triplex mud pump. The mud pump output manifold is input to the pressure relief valve of the present disclosure. That valve is operated so that the output pressure is controlled to a desired level. The output pressure accomplished by the present regulator enables the system to operate with a controlled pressure level. This is important to insure that the pressure experienced down hole at the drill bit and in the formations penetrated by the drill bit is regulated. Mud pressure at the bottom of the drill stem is an important factor. The pressure has to be maintained at a certain range to prevent formation damage. As the well is drilled, there is a tendency for the liquids in the mud to migrate into the formation and to form a residue known as a mud cake in the well borehole. The mud cake is generally desirable. The depth of penetration into the formation by the liquid solvent is not as desirable in that it may force the hydrocarbons in the formation back away from the well borehole and make it more difficult to start production flowing. That is one problem with excessive bottom hole pressure. Where the bottom hole pressure is inadequate, there is the risk that gas flow will start, and the gas will then cut or thin the drilling mud. Typically this happens with gas bubbles entrained in the mud which are small in size at the bottom of the borehole but which become larger at the surface where the hydrostatic head on the mud is less. This thinning of the drilling fluid describes a process known as gas cutting. When the mud is gas cut, it is not as reliable in operation because the standing column of mud in the well borehole does not have the necessary weight. In other words, it tends to froth and reduces the bottom hole pressure, creating a dangerous condition. The bottom hole pressure is in part controlled by the mud pump pressure. It is therefore rather important to regulate and control the mud pump pressure.

The apparatus of this disclosure is briefly summarized as a pressure regulator having a movable element which is dynamically responsive to pump output pressure. The movable element is located in the mud flow path and is installed so that it modulates the mud flow. Dynamically, movement is occasioned by the movable element which is in a slight pressure balanced condition. On one side, pump pressure is applied. On the other side, the same pump pressure is applied but the second side is less in diameter and has a reduced cross-sectional area. There is a compensation applied to this side for balance purposes. That compensation is provided by a piston rod extending to a remote chamber, and the chamber itself is provided with a hydraulic fluid pressure balance across the chamber. Through the use of a restricted flow path, movement of the rod is controlled so that it modulates the forces applied to the valve element. This accomplishes a desired setting under the control of hydraulic fluid. That is provided with a reduced hydraulic pressure. There is a multiplier which reduces the hydraulic pressure required for an operating range.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

The single drawing in this disclosure is a pressure relief valve shown in sectional view where the section cut line is along a diameter of the cylindrical housing thereof showing internal details of construction, and further including a schematic connecting the valve of this disclosure to a pump and in a mud flow system.

DETAILED DESCRIPTION OF THE PREFERRED EMBODIMENT

Attention is directed to the only drawing where the numeral 10 identifies the pressure relief valve of the present disclosure which is connected in a mud flow system. The mud flow system will be described to provide the context. The mud flow system is shown in schematic form for simplification. The system includes a triplex mud pump 12 which delivers a flow of mud through an output line, typically around three inches in diameter. It is delivered into the valve 10 of this disclosure. The regulated output is delivered to the rig mud line 14. The mud line 14 extends upwardly in the derrick and connects to the top end of the drill stem 16. The drill stem is supported in the derrick on a cable extending through the crown block and down to the traveling block which supports the swivel and mud line connected to the swivel. The drill stem at the top end incorporates a Kelly which is a pipe having a square profile. The square shaped Kelly extends through the rotary table which imparts rotation to the drill stem. The drill stem includes one or more joints of drill pipe. At the bottom, it includes one or more drill collars which are drill pipe which an extra thick wall to enhance weight and stiffness. The bottom-most component in the drill stem is the drill bit.

The mud flow is returned to the surface in the annular space on the outside of the drill stem. The mud is delivered up through this annular space and flows through the blowout preventor stack under the drilling rig. It is collected in a mud recovery line and delivered away from the drilling rig to a degasser 18. Sometimes, a degasser is replaced by a shale shaker or other screening device. After degassing, it is then delivered into a set of mud pits 20. The heavier cuttings are permitted to fall to the bottom of the mud pits and the lighter drilling mud is recovered from the top of the mud pits. This helps remove some, perhaps most of the cuttings. The mud is then recycled by delivery from the mud pits 20 back through the pump 12 and flows through the same route again. At various locations, mud line pressure measuring instruments 22 form an indication of mud pressure.

The triplex pump 12 delivers mud with peaks resultant from the three pistons sequentially operating in the pump. The three pistons provide pressure peaks creating a ripple. If the pump is operated at 100 rpm, there will be three peaks per cycle or 300 peaks per minute. Variations in pump pressure occur for these and many other reasons. It is therefore desirable that they be smooth. The valve 10 is able to accomplish this.

Going now to the valve in particular, and tracing through its construction form bottom to top, the pump 12 is connected through a suitable flow line connected to valve inlet opening assembly 24. That has the form of a hollow sub which is provided with an internal passage 26. It is constructed with an external flange 28 to enable attachment by a set of bolts 30 located on a flange circle. The number of bolts, thickness of the flange and other details of this sort are controlled so that the sub 24 is constructed in accordance with industry standards. The sub 24 is bolted at the flange to the valve body 32. The body 32 is provided with an enlarged internal passage at 34. This enables a sleeve 36 to be inserted for locking purposes. The sleeve locks in position a lower seal ring 38. The seal ring 38 is similar to the upper seal ring 40 except that they are at opposite ends of a movable valve element 42. The upper seal ring 40 is locked in place with a similar sleeve 44. The sleeves 36 and 44 serve the same function and are relatively similar in construction.

The valve body 32 is an elongate cylindrical construction having an appended and integrally constructed outlet housing 46. The housing 46 connects serially to an output sub 48. Together, they have a common passage indicated at 50. They are also joined with appropriate bolts on a flange bolt circle, the bolts 52 being incorporated in appropriate number and rating. This locates the valve outlet 54 for connection with the rig mud line 14 as previously mentioned. The upper end of the valve body is closed over by a hydraulic chamber in a cylinder 58. The internal chambers will be detailed later. At the lower end, it incorporates a flange 60. The flange 60 aligns against the top face 62 and is joined to it again with bolts connecting to the flange. The bolts 64 are similar to the bolts 30 previously mentioned. Coming back now to the movable valve element 42, it will be observed that the passage 26 is extended inside the sleeve 44. This defines the passage 66 above the movable element. The element 42 can move upwardly and downwardly in the aligned passages 26 and 66 because they have the same, diameter. The element 42 serves as the modulating valve element in the system. It moves in the passages 26 and 66 which have equal cross-sectional areas. The passage 66 enables mud under pressure to act on the top side of the valve element. The valve element 42 is provided with the internal passages 68 which communicate to the top end of the valve element. This enables it to operate in a pressure balanced mode except for the loss of area in a piston rod 70. That loss of area will be detailed below.

The pistol rod 70 extends up through a captured cylinder head 72. That cylinder head is located at the bottom end of the chamber 58. The piston rod 70 is joined to a guide bushing 74 in the chamber 76. The bushing 74 is also a seal ring support structure so that the chamber 76 can fill with hydraulic oil which does not escape at the bottom end of that chamber. Moreover, the bushing 74 serves as a compression piston for hydraulic oil in the chamber 76 as will be described. The piston rod connects with an upper rod 80. The rod 80 has an outlet passage 82 which defines the outlet end of a flow path through a check valve 84. The check valve 84 is a one way valve which permits flow from the top of the drawings towards the bottom, i.e., out through the passage 82. This flow path will come into significance momentarily. The system includes a pair of hydraulic lines. The hydraulic line 86 is an input to fill the chamber 76. The piston rod 80 is enlarged at the upper end slightly, this being identified as the piston rod extension 90 which has slightly larger diameter. It is however received in an upper head 92 which is drilled to a diameter sealing against the larger rod diameter 90. With a suitable seal ring around the rod 90, flow along the piston rod 90 is prevented so long as the seal ring is in the upper head 92. The seal ring however will break clear of that and permit filling of the upper chamber 94. The chamber 94 is under a floating piston 96. The piston 96 is below an air cushion in the chamber 98. The chamber 98 conveniently is provided with air at low pressure which pressure can be regulated to some low value such as atmospheric. The inlet to the chamber 98 enables a reset pulse to be applied for moving the valve element to the fully closed position. Hydraulic oil in the upper chamber 94 is permitted to escape through an outlet control valve 78 which is adjustable to control the hydraulic oil dump from the system.

Consider operation of the equipment as described. The pump increases pressure until the movable valve element 42 is forced upwardly. Equal pressures are applied to the top and bottom of the element 42. However, the cross-sectional area of the top side of the element 42 is less than the cross-sectional area of the bottom side. While the passages 26 and 66 are equal in diameter, the top side area is reduced by the amount of cross-sectional area involved in the piston rod 70. That creates a force differential forcing the piston rod 70 upwardly. The controlling force of the system is applied through the rod 70. As just stated, the valve element 42 will open because there is a greater force acting to open it rather than to close it. It starts opening in response to this increased mud pressure. As it moves, there will be a change in the force at the upper end of the piston rod 70. This involves the application of forces serially applied to the rod 70 from the rod 80 and that from the enlarged rod 90. To consider how this occur, assume for the moment that the rod 70 moves upwardly. Hydraulic oil first fills the chamber 76. As the rod 80 moves upwardly, the chamber 76 pressure is held steady until the seal ring on the rod enlargement 90 pops through and disengages at the upper end. The seal ring on the enlarged rod 90 breaks free of the surrounding divider wall 92. This then permits the chamber 94 to be filled by flow along the rod 90. Oil under pressure will move the free floating piston 96 upwardly in the chamber 98. The piston 96 separates the oil from the air in the chamber 98. One force acting on the piston rod is derived primarily from the hydraulic oil pressure on the load piston 74. That force reduces to zero on the loss of hydraulic fluid from the chamber 76 into the upper chamber 94. While that movement may occur, the force on the rod 70 acts against the movable valve element 42 to control upward movement. This modulates the opening of the valve element 42.

The piston rod 70 will close the valve element 42 at least partially because the hydraulic fluid in the upper chamber 94 is vented through the check valve 84 and out through the port 82 to refill the chamber 76. That flow path enables relatively quick response (downward movement). For movement in the opposite direction, there is a buildup of force in the piston rod 70 until the time that the piston rod 90 clears and the seal breaks free. In other words, a small upward movement of the rods 70, 80 and 90 prior to the seal disengagement is then accompanied by the quick flow of hydraulic fluid from the chamber 76 up into the chamber 94. There is a restrictive aspect to this upward flow of hydraulic fluid around the rod 90 because the rod 90 blocks most of the opening This restricted flow path results in controlled filling of the upper chamber 94.

The valve 78 is used to control the hydraulic pressure in the system. This is an adjustable mechanism which permits the valve element to be raised or lowered. The valve element 78 is therefore controllably set so that the pressure in the quiescent state in the chamber 76 is regulated.

In normal operation assume that the valve element 42 is in the down position. Pressure at the inlet side builds up to force the valve element 42 upwardly. This force is transmitted to the piston rod 70, the piston rod 80 and the piston rod 90. They move together as a unit. This raises the pressure in the chamber 76. Assume for the moment that a force balance is achieved. That will then stop movement of the valve element 42.

If the pressure below the valve element 42 continues to increase, the pressure in the chamber 76 is raised. Eventually, that pressure will exceed the setting of the adjustable valve element 78 which is then forced open. This delivers hydraulic oil through the flow line 86 out of the chamber 76. The oil flows through the valve 78 and into the chamber 94. As oil flows out of the chamber 76, the piston 74 moves upwardly along with the piston rods 70, 80 and 90. When the seal around the rod 90 breaks free, there is a large flow of oil so that the piston rod 70 and connected equipment will rise, ultimately moving to the point that the chamber 76 is substantially empty of hydraulic oil. The oil is pumped out. This occurs in conjunction with opening the seal 38 around the valve element 42. This opens the controllable flow path. As previously mentioned, resetting this control under an external source by delivery of an air pressure pulse into the top end of the chamber 98. Ordinarily, that chamber is permitted to float at atmospheric pressure. It can be used for a control line which delivers a closing pulse.

Wear parts are readily replaced. The seal rings 38 and 40 probably wear most of all. They can be easily replaced by simple disassembly to retrieve the sleeves 36 and 44 which lock them in position. Moreover, the system is constructed so that drilling fluid is kept below the relatively thick head of the load piston 72. In fact, loss of drilling fluid along the piston rod 70 into the chambers above is prevented. Hydraulic fluid in the chamber 76 is not permitted to get into the head 72 and commingle with the drilling fluid. In summary, service is easily accomplished. These wear parts are easily removed and placed. Periodic maintenance of the system typically involves replacement of selected parts. As desired, other components can be periodically replaced but they generally have a fairly durable life.

One context for the present apparatus is control of mud flow. In that instance, it is connected downstream from a typical triplex mud pump at a drilling rig. Normally, it is used to regulate the pressure of the mud which is applied to the downhole drill stem extending into the well borehole for lubrication of the drill bit and removal of the cuttings. For any number of reasons, the dynamic pressure load on the mud system may fluctuate. For instance, the mud pressure at the surface can drop because the well borehole penetrates accidentally into a void or other low pressure formation which will drop the mud pressure momentarily. On the opposite hand, the drill bit may penetrate into a high pressure zone so that gas is produced at very high pressure, thereby raising the pressures encountered by the mud flow. Any number of reasons can be suggested in addition to these whereby the pressure will fluctuate.

Pressure fluctuations are commonplace in operation. Such pressure variations are apt to cause all types of problems. The apparatus 10 of this disclosure helps overcome these problems. Drilling mud can be very abrasive to the pump and any metering device controlling the pump. The construction of the present device uses replaceable seal members 38 and 40 so that the valve element can move readily in them to mud flow isolation at full closure. The valve element is relatively dynamic. The response time for movement is relatively quick. In general terms the control mechanism illustrated in the drawings finds great use in control of the other incompressible adhesive fluid by the modulation of the valve element 42.

While the foregoing is directed to the preferred embodiment of the present invention, other and further embodiments of the invention may be devised without departing from the basic scope thereof, and the scope thereof is determined by the claims which follow.

I claim:

1. A pressure regulator valve assembly for connection to the output of a pressure varied supply source wherein;
   (a) the supply source output is delivered through an inlet port in a valve body;
   (b) the valve assembly comprises a movable valve element in said valve body for modulating flow between said inlet port and a valve body outlet port;

(c) said ports are connected by a passage through said valve body which surrounds said valve element;

(d) the movable valve element connects with a piston rod and a hydraulically operated, pressure responsive load piston connected to said piston rod to move said piston rod and thereby open and close said valve assembly; and wherein (e) load pressure from said inlet port upon said valve element is balanced by hydrostatic force acting upon said load piston.

2. Pressure regulator valve assembly of claim 1 wherein:

(a) said piston rod supports said load piston moving with said rod;

(b) a cylinder surrounding said load piston defines a first chamber above said load piston;

(c) a hydraulic fluid circuit
   (i) connects into said first chamber above said load pistons,
   (ii) connects to a second chamber below a floating piston, and
   (iii) moves said load piston so that said piston moves in response to hydraulic fluid in said first chamber.

3. The apparatus of claim 2 wherein said piston rod has a first position denoted as the closed position and a second position denoted as the opened position, and wherein said piston rod in moving between the open and closed positions moves through a transition creating an unblocked oil flow between said first and said second chambers.

4. The apparatus of claim 1 wherein said pressure regulator valve assembly includes said load piston and said piston rod extending therefrom and positioned in:

(a) a cylinder around said load piston defining a first chamber therein;

(b) a hydraulic oil flow path from said first chamber to reduce pressure within said first chamber; and (c) a controllable valve for controlling fluid flow through said flow path.

5. A mud flow pressure control valve assembly connected between a mud pump and drill stem, comprising:

(a) a valve body having
   (i) a mud inlet port;
   (ii) a mud outlet port;
   (iii) a mud flow passage between said inlet and outlet ports;

(b) a movable valve element cooperative with said passage movable into a closed position and also movable into an open position with respect to a valve seat to control mud flow along said passage;

(c) a piston rod connected to said valve element to move therewith;

(d) a load piston in a cylinder defining a sealed first chamber adjacent to said load piston;

(e) a hydraulic circuit comprising a second chamber defined by a floating piston and connected to said first chamber to enable hydraulic fluid to flow between said first and second chambers;

(f) a flow restrictor in said circuit to retard hydraulic oil flow within said hydraulic circuit so that load piston movement in said first chamber is correlated to oil flow; and (g) wherein said load piston moves with said valve element and said load piston movement in said cylinder forms a force transferred by said piston rod so that said valve element and said piston modulates pressure at said mud outlet port.

6. The assembly of claim 5 wherein said flow restrictor comprises a flow path connecting said first chamber and said second chamber and having a check valve in said path.

7. The assembly of claim 6 wherein said flow restrictor comprises a flow path connecting said first chamber and said second chamber and having a pressure adjustable relief valve.

8. The assembly of claim 6 wherein said flow restrictor comprises a movable seal cooperative with said piston rod to open selectively on rod movement.

9. The assembly of claim 8 further comprising a third chamber above said floating piston and separated from said second chamber by said floating piston.

10. The assembly of claim 9 wherein said third chamber:

(a) is at low pressure when said assembly is operation; and (b) is brought to an elevated pressure to reset said movable seal.

11. The apparatus of claim 5 wherein:

(a) said load piston and said floating piston and said cylinder are axially aligned with said valve element;

(b) said load piston and said rod defines said first chamber so that said first chamber forms pressure against said load piston and said rod for moving said rod to restrict mud flow along said passage;

(c) said hydraulic circuit connects from said first chamber to said second chamber to enable said first chamber to become smaller on rod movement; and (d) said hydraulic circuit directs hydraulic oil in said first chamber to said flow restrictor.

* * * * *